United States Patent Office 2,979,436
Patented Apr. 11, 1961

2,979,436
TREATMENT OF TOMATO PLANTS TO PREVENT EARLY BLIGHT DISEASE

Arthur Lawrence Fox, Greenwood, Va., and Irving Joseph Krems, Vienna, Austria, assignors to Colgate-Palmolive Company, New York, N.Y., a corporation of Delaware No Drawing. Filed Oct. 20, 1958, Ser. No. 768,058

10 Claims. (Cl. 167—30)

The present invention relates to a method of treating tomato plants to prevent early blight disease.

Early blight disease is one of the most common diseases of field-grown tomatoes, causing stem and leaf infections that severely damage the plants. This is a particularly serious problem with respect to field-grown seedlings.

In accordance with the present invention a method of treating tomato plants to prevent early blight disease comprises contacting tomato plants with a higher alkyl aryl sulfonate salt of a heavy metal of the third period. It has been found that treatment of the foliage of tomato plants with the instant salts confers on them a high degree of resistance to early blight, even after such plants have been exposed to heavy rainfall.

The higher alkyl aryl sulfonate heavy metal salts employed in the process of the present invention are known to the art. They may be prepared by neutralizing a suitable higher alkyl aryl sulfonic acid with a base derived from the desired heavy metal cation, suitable such heavy metals being the heavy metals of the third period, especially those selected from the group consisting of copper, zinc and iron. The copper salts are especially preferred, as they are superior to and not the equivalent of the other heavy metals by virtue of the outstandingly high order of effectiveness of the said copper salts on plants which are exposed to heavy rainfall after application of the sulfonate salt.

The anion of the salts used in the present process is derived from a higher alkyl aryl sulfonic acid in which the alkyl substituent contains 8 to 20 carbon atoms and may be either straight or branched chain, branched chain being preferred. Particularly preferred is the branched chain 15 carbon atom alkyl substituent derived from a propylene pentamer. The aryl portion of the molecule typically may be derived from benzene, toluene, naphthalene and the like. Examples of specific sulfonate salts suitable for use in the present treatment are the nonyl benzene sulfonate of zinc, the dodecyl benzene sulfonate of manganese, the octadecyl benzene sulfonate salt of zinc, and the pentadecyl benzene salts of copper, zinc and iron (ferrous). Especially preferred is the cupric salt of pentapropylenedebenzenesulfonic acid.

Although the instant salts may be applied to tomato plants by known dusting techniques, it is preferred that they be applied to the foliage of the plants by means of an aqueous spray using a concentration of the salt varying from a small but effective amount sufficient to prevent early blight up to about 6000 parts per million, and preferably from about 500 to 3000 parts per million. The necessary frequency of application varies with growing conditions, e.g. rainfall and growth rate, and may vary considerably, as for example, it may be weekly, every ten days, or fortnightly.

The heavy metal higher alkyl aryl sulfonate salts of the process of this invention are self-dispersing. They may, however, be used in conjunction with an auxiliary surface-active dispersing agent either alone or in further admixture with other water insoluble agents active to prevent early blight of tomatoes but requiring auxiliary dispersants when used in aqueous systems, e.g. "Maneb" (manganese ethylenebisdithiocarbamate) and "Captan" (N-trichloromethylmercapto - 4 - cyclohexene - 1:2 dicarboximide). Preferably, the auxiliary dispersing agents employed with the instant heavy metal sulfonates are highly water soluble higher alkyl aryl sulfonate salts such as the alkali metal or alkaline earth salts, e.g. sodium pentadecylbenzenesulfonate and/or magnesium dodecylbenzenesulfonate. The instant heavy metal sulfonate salts may also be used in admixture with other organic and inorganic constituents in addition to the foregoing blight preventatives and surface-active dispersing agents. Thus they may be used in conjunction with excipients employed in preparing dusting powders, with inorganic salts such as sodium sulfate or the sulfate salt of the heavy metal cation of the higher alkyl aryl sulfonate salt employed, and with a wide variety of other water soluble and insoluble constituents compatible therewith.

The following examples are given to additionally illustrate the invention, and it will be understood that the invention is not limited thereto. In these examples all parts or percentages are by weight unless otherwise specified.

Example I

The foliage of half of a group of Bonny Best greenhouse tomato plants six weeks old is sprayed with one thousand parts per million cupric pentadecylbenzenesulfonate in water. (The pentadecyl radical has a branched chain structure and is derived from a propylene pentamer.) The other half of the group is used as a control and is not sprayed. After the spray dries, the entire group of plants is placed under an automatic sprinkling device and subjected to simulated rain in an amount equivalent to a two-inch rainfall.

The entire group of plants is then atomized with an aqueous spore suspension of *Alternaria solani*. The group is then placed in a chamber maintained under conditions favorable to growth of the fungus (95% relative humidity, 70° F.) for 24 hours. Thereafter the plants are grown in a greenhouse for an additional 48 hours. Inspection of the plants at the end of this period discloses that the control portion contains 263 spots per plant, whereas the portion which has been sprayed with the cupric pentadecylbenzenesulfonate, contains only 11 spots per plant indicating a level of control of 96%.

Similar but somewhat less effective control is obtained using copper dodecylbenzenesulfonate wherein the dodecyl radical has a branched chain structure and is derived from tetrapropylene.

Example II

The procedure of Example I is repeated using a spray containing 2000 parts per million zinc pentadecylbenzenesulfonate (derived from pentapropylene) in water. The level of control obtained is 93%.

Example III

The procedure of Example I is repeated using a spray containing 2000 parts per million ferrous pentadecylbenzenesulfonate (derived from pentapropylene). A level of control of 85% is obtained.

The specificity of action of the heavy metal sulfonate salts of the instant invention is illustrated by the facts that if the process of Example III is carried out with potassium pentadecylbenzenesulfonate, the level of control obtained is only 27%, and if carried out with magnesium dodecylbenzenesulfonate, the level of control obtained is only 5%. The present heavy metal sulfonate salts are also highly advantageous in that they do not absorb moisture during storage. Thus they are non-caking and remain free-flowing and easy to handle.

As may be seen from the foregoing, the process of the present invention is highly efficacious in preventing early blight of tomatoes. It has also been found that the present process confers some resistance to late blight on tomato plants. Other advantages include ease of handling and application, low cost, effective and long-lasting action, self-dispersibility, stability on aging, and compatibility of the sulfonate salts with other agents.

While there has been disclosed and described what is at present considered to be the preferred embodiment of the invention it will be understood, of course, that many changes, modifications and substitutions may be made therein without departing from the true scope of the invention as defined in the appended claims.

What is claimed is:

1. A method of treating tomato plants to prevent early blight disease which comprises contacting tomato plants with a higher alkyl benzene sulfonate salt of a heavy metal of the third period selected from the group consisting of iron, zinc, and copper, said higher alkyl substituent containing from 8 to 20 carbon atoms.

2. A method of treating tomato plants to prevent early blight disease which comprises contacting tomato plants with a higher alkyl benzene sulfonate salt of copper, said higher alkyl substituent containing 8 to 20 carbon atoms.

3. A method of treating tomato plants to prevent early blight disease which comprises spraying tomato plants with an aqueous higher alkyl benzene sulfonate salt of a heavy metal of the third period selected from the group consisting of iron, zinc, and copper, said alkyl radical having a branched chain and containing from about 8 to about 20 carbon atoms and said aqueous spray containing said salt in a small but effective amount sufficient to prevent early blight disease up to about 6000 parts per million.

4. A method of treating tomato plants to prevent early blight disease as set forth in claim 3 wherein said aqueous spray contains from 500 to 3000 parts per million of said salt.

5. A method of treating tomato plants to prevent early blight disease as set forth in claim 3 wherein said salt is a zinc salt.

6. A method of treating tomato plants to prevent early blight disease as set forth in claim 5 wherein said salt is the pentadecylbenzenesulfonate salt of zinc.

7. A method of treating tomato plants to prevent early blight disease as set forth in claim 3 wherein said salt is an iron salt.

8. A method of treating tomato plants to prevent early blight disease as set forth in claim 7 wherein said salt is the pentadecylbenzenesulfonate salt of iron.

9. A method of treating tomato plants to prevent early blight disease which comprises spraying tomato plants with an aqueous higher alkyl benzene sulfonate salt of copper, said alkyl radical having a branched chain and containing from about 8 to 20 carbon atoms and said aqueous spray containing said copper salt in a small but effective amount to prevent early blight up to about 6000 parts per million.

10. A method of treating tomato plants to prevent early blight disease as set forth in claim 9 wherein said aqueous preparation contains from 500 to 3000 parts per million of cupric pentapropylenebenzenesulfonate.

References Cited in the file of this patent

UNITED STATES PATENTS 2,375,095    Flett  ---------------- May 1, 1945

OTHER REFERENCES

Frear: A Catalogue of Insecticides and Fungicides, vol. II, 1948, p. 30.

Surface Active Agents, Schwartz, vol. I, 1949, pp. 153, 495–499.

Surface Active Agents and Detergents, vol. II, 1958, pp. 238–241.

Horsfall: Principles of Fungicidal Action, 1956, pp. 88–90, Chronica Botanica Co.